United States Patent [19]
Leinkram et al.

[11] 3,871,902
[45] Mar. 18, 1975

[54] METHOD OF COATING A SPACECRAFT SHELL SURFACE

[75] Inventors: Charles Z. Leinkram, Bowie; Robert S. Rovinski, Forest Heights, both of Md.

[73] Assignee: The United States of America as represented by the Secretary of the Army, Washington, D.C.

[22] Filed: Mar. 22, 1973

[21] Appl. No.: 343,771

[52] U.S. Cl. ............... 117/49, 117/35 S, 117/35 V, 117/50, 117/70 S, 117/71 M, 117/107, 117/129, 117/131, 117/135.1

[51] Int. Cl. .......................... C23d 5/00, C23b 5/26

[58] Field of Search ........... 117/49, 50, 70 S, 71 M, 117/35 R, 35 S, 35 V, 107, 94, 129, 131, 135.1; 136/206; 244/117.1, 1 SS, 158, 173, 117 R, 117 A

[56] References Cited

UNITED STATES PATENTS

| | | | |
|---|---|---|---|
| 3,499,780 | 3/1970 | Etherington et al. | 117/35 S |
| 3,565,671 | 2/1971 | Teeg et al. | 117/71 R |
| 3,622,400 | 11/1971 | Lauriente et al. | 148/6.14 R |
| 3,671,286 | 6/1972 | Fischell | 117/106 R |

*Primary Examiner*—Thomas J. Herbert, Jr.
*Assistant Examiner*—Bruce H. Hess
*Attorney, Agent, or Firm*—R. S. Sciascia; Arthur L. Branning; M. L. Crane

[57] ABSTRACT

A method of treating the surface of a spacecraft or solar panel for controlling the absorption and emission of energy.

4 Claims, No Drawings

METHOD OF COATING A SPACECRAFT SHELL SURFACE

BACKGROUND OF THE INVENTION

This invention is directed to a spacecraft structure including solar cell panels and more particularly to a method of preparing the outer surfaces thereof for thermal absorption and emission control.

Satisfactory operation of a spacecraft depends on adequate temperature control of the many components within the spacecraft. This is done by passive temperature control; i.e., the spacecraft shell or body is used to control temperature with the heat in the form of infrared emission from the operative components being passed to the spacecraft body for emission. The principle means of controlling the temperature of a spacecraft is by the absorbed and emitted radiation energy. An important consideration for controlling the temperature of a spacecraft is the solar absorptivity, $\alpha_s$, and hemispherical emissivity, $\epsilon$, of the shell. Thus, thermal control is acheived by proper thermal coatings and surface finishes. The thermal coating and finishes must be such that solar energy input into the spacecraft surfaces must be minimized while as much thermal energy as possible is concurrently emitted as infrared radiation.

Spacecraft surfaces should be formed such that when their surfaces are exposed to solar radiation optimum thermal control will be exercised. In obtaining optimum conditions, surface coatings must be such that the absorptivity in the solar region is as low as possible. The emissivity in the infrared region is as high as possible so that a low solar absorptivity, $\alpha_s$, relative to the hemispherical emissivity, $\epsilon$, of the shell is $\alpha_s/\epsilon$. The surface coatings should be easily cleanable without harmful effects to the surface. The coatings should withstand extreme temperature changes. The coatings, especially for solar cells should function as an electrical insulator as well as a good thermal conductor. One of the most important features is that the structure be such that solar energy input is minimized while as much thermal energy as possible is concurrently emitted.

Heretofore spacecraft surfaces have been constructed and formed with special surface coatings. However, these surface coatings have their drawbacks. One such prior art coating has been white paint. White paint has been found to be unstable under solar radiation absorption. Paint degrades due to handling and the painted surface is subjected to scratches as well as harmful effects due to cleaning. Other coatings have been used which degrade due to handling, and they are easily scratched. Some coatings are not easily applied, are time consuming in application, are formed with expensive materials and present a weight problem.

SUMMARY OF THE INVENTION

This invention is directed to a method for treating the outer surface of a satellite structure or solar cell panel for absorption of solar thermal radiation and emission of heat. The method includes preparation of the surface subsequently coating and heating the surface until the desired surface coating thickness is obtained.

STATEMENT OF THE OBJECTS

It is therefore an object of the present invention to provide an efficient, relatively inexpensive method of treating the outer surface of a spacecraft or solar cell panel for absorption of solar thermal radiation and emission of heat from within the surface.

Another object is to provide a spacecraft surface or solar cell structure which provides good electrical insulation with good thermal transmission qualities.

Still another object is to provide a surface coating which will have long life time when exposed to thermal radiation and will resist surface scratches.

Other objects and advantages of this invention will become obvious from a reading of the specification.

DETAILED DESCRIPTION

This invention is directed to a method of coating the surface of a satellite or spacecraft structure to provide a stable low $\alpha_s/\epsilon$ ratio coating. In the coating, $\alpha_s$, is dependent on the material and finish of the surface and, $\epsilon$, is dependent on the type and thickness of the coating.

In carrying out the method, the surface to be coated is cleaned, then polished or color buffed to a high shine. Once the high shine has been obtained, the surface is coated by dipping, spraying, painting, or spin coating with a liquid glass solution. Once the liquid glass solution coating has been applied onto the surface, the coated surface is baked at a desireable temperature to drive off the solvents and to densify the glass. The coating and baking may be repeated until the desired $\alpha_s/\epsilon$ ratio is reached.

It is well known in the art that solar cell panels for spacecraft or satellites require coatings having a good thermal conductance as well as good electrical insulation qualities. In the method for producing good coatings for solar cell panels, there is a requirement that the surface have good reflective properties. Therefore, solar cell panels require a reflective surface. Thus, the surface is polished or color buffed to a shiny low $\alpha_s/\epsilon$ ratio color then coated with a silver coating. The silver coating is buffed to a high polish and then coated with a liquid glass solution and baked as set forth above. Upon completion of the glass coating either a chrome copper or an aluminum deposition is carried out and subsequently back etched to produce mounting pads for the solar cells. The solar cells are mounted onto the mounting pads by use of a suitable solder such as indium.

As an example of carrying out the method of coating an aluminum alloy 5051 or 6061 surface of a spacecraft or satellite, the method is described as follows:

First, clean the aluminum surface by use of a vapor degreaser to remove organic stains, mechanically polish the cleaned surface to a high gloss by use of aluminum oxide and a buffing wheel and redegrease. Spray or paint a layer of about 1,000 Angstroms thickness of liquid glass solution such as an amorphous lead silica film onto the highly polished surface and bake the coated surface at a temperature of from about 100° to about 250°C from about 1 hour to about 3 hours and repeating until a coating thickness of 5 microns ± 1 micron with an $\alpha_s/\epsilon$ ratio of about 0.46 is obtained.

A coating formed in accordance with the above method has been tested at an accelerated life test of 159 hours at the equivalent of 16 suns with a change of less than 0.5 percent in the optical properties.

An example of forming a coated aluminum 5052 or 6061 surface of a spacecraft or satellite for mounting solar cells thereon is as follows:

First, polish the surface as set forth in the Example above, plate a layer of silver having a thickness of 1 mil onto the polished surface, polish the silver plate to a high gloss and then coat the silver plate with a liquid glass solution and bake as set forth in the above Example to form a glass coating of about 5 micron ± 1 micron.

Another method for improving the alpha in the visible and near infrared region is to first coat the color buffed aluminum with two coats of the amorphous lead-silica film of a thickness of about 7,000 Angstroms and vacuum deposit aluminum of about 1 mil thickness onto the amorphous film. The resulting aluminum will approach a specular finish with higher reflectance than the original color buffed surface, and because of its increased reflectance improve the alpha after being coated again with 5 microns of the silica film as previously set forth.

Obviously many modifications and variations of the present invention are possible in the light of the above teachings. It is therefore to be understood that within the scope of the appended claims the invention may be practiced otherwise than as specifically described.

what is claimed is:

1. A method of coating a spacecraft shell surface to improve the optical qualities thereof by providing a low solar absorptivity, $\alpha_s$, with a relatively high spacecraft shell emissivity, $\epsilon$, and to provide good electrical insulation for securing solar cells thereto which comprises,
cleaning said surface to be coated,
polishing said cleaned surface to a high gloss,
coating said polished surface with a liquid glass solution such as a lead silica film,
baking said liquid glass solution coated surface at a temperature of from about 100° to 250°C for a period of from about 1 hour to about 3 hours to densify said glass solution,
continuing said coating and baking steps until a coating thickness of about 5 microns with an $\alpha_s/\epsilon$ ratio of about 0.46 is obtained.

2. A method as claimed in claim 1 which includes, silver plating said high gloss polished surface prior to coating with said liquid glass solution.

3. A method as claimed in claim 2 which includes,
prior to applying said silver plating,
coating said polished surface with one coating of liquid glass solution and baking said liquid glass solution.

4. A method as claimed in claim 2 which includes,
prior to applying said silver plating onto said polished surface,
applying one coating of liquid glass solution onto said polished surface baking said liquid glass solution and,
vacuum depositing an aluminum film onto said one coating.

* * * * *